United States Patent Office 3,518,372
Patented June 30, 1970

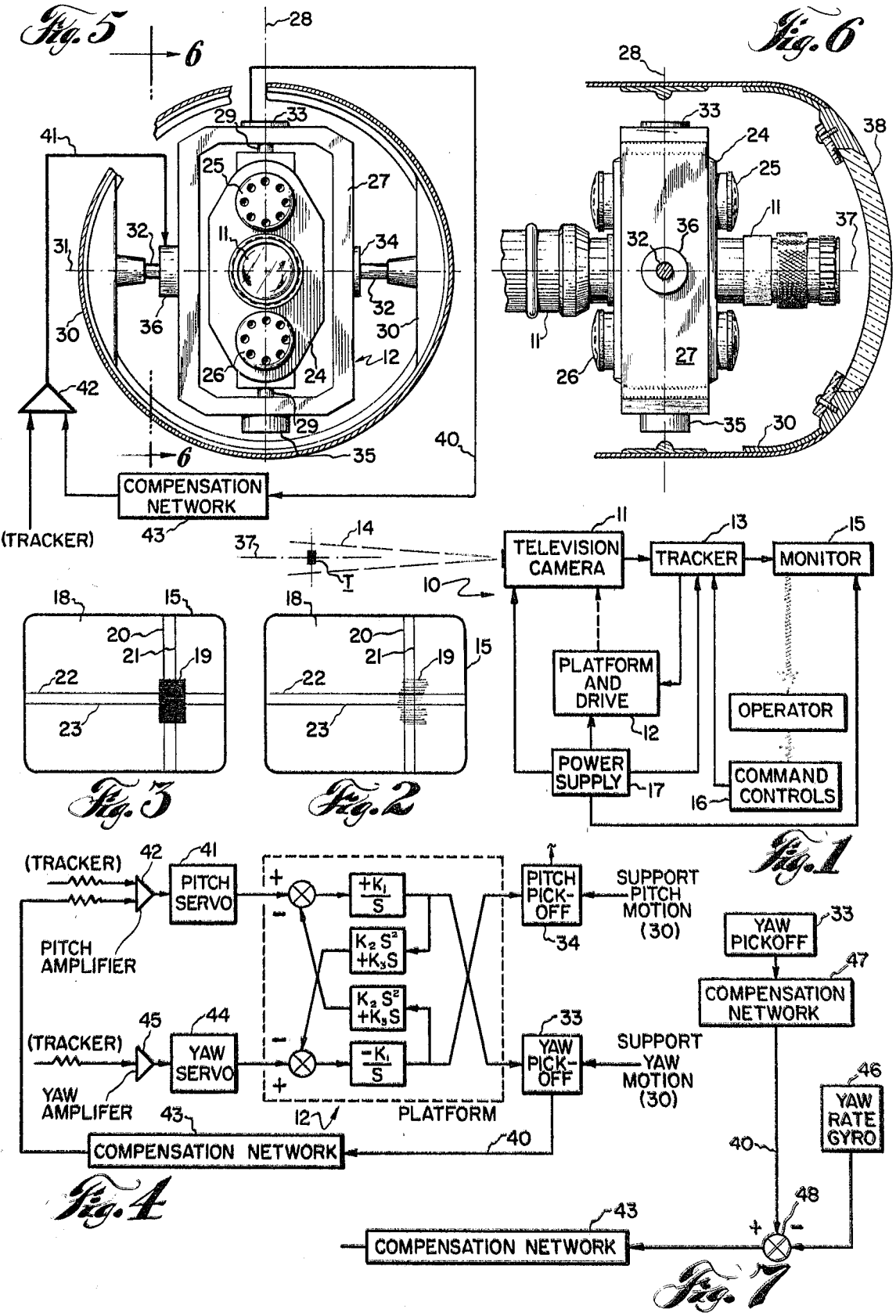

3,518,372
TRACKING SYSTEM PLATFORM STABILIZATION
Theron J. Johns, Columbus, Ohio, assignor to North American Rockwell Corporation, a corporation of Delaware
Filed Nov. 14, 1966, Ser. No. 593,931
Int. Cl. H04n 7/18
U.S. Cl. 178—7.81                           7 Claims

ABSTRACT OF THE DISCLOSURE

A tracking system having a platform that supports a television camera sensor and a stabilization gyroscope means and that is subjected to platform vibration is provided with apparatus and methods for effecting improved platform nutation damping to minimize the loss of sensor lock-on during system operation.

---

The instant invention basically involves an improvement to a tracking system that utilizes a television camera as the system sensor device. Such systems, as in the case of the present invention, typically include a gyroscopically stabilized platform that carries the television camera sensor and that is gimbaled about both a vertical (yaw) axis and a transverse (pitch) axis at right angles to the vertical axis. The optical axis of the television camera sensor is normally positioned at right angles with respect to both the vertical and transverse axes during system tracking alignment with the selected target and generally corresponds to the system directional axis. Closed loop servomechanisms cooperate with the platform and function to drive the platform about the pitch and yaw axes to maintain the television camera optical axis in directional alignment with the object being tracked; a tracker unit, such as a signal processor that develops tracking error correction signals based on the coincidence of a target edge or edges with a variably positioned tracking gate, normally provides the rate command signals required by the servomechanisms. Position pick-off devices are incorporated in the system platform to provide output signals indicative of the platform pitch and yaw rotational displacements relative to the platform support and relative to the system directional axis. Improved system tracking performance can be obtained in accordance with the instant invention by increased platform damping through the use of the yaw position pick-off signal, in properly compensated form, as a feedback signal to the rate command for the pitch servomechanism thereby providing the platform with a novel closed servo loop. One important advantage and object of the invention is that damping of the platform nutation mode may be accomplished without introducing cross-coupling effects into the dynamics characteristics of the platform.

Other objects and advantages of the invention will become apparent from a consideration of the following drawings and detailed description.

In the drawings:
FIG. 1 is a schematic block diagram disclosing the type of tracking system to which the instant invention generally has application;
FIG. 2 is a television camera raster presentation schematically illustrating a tracking loss of lock-on relationship between a tracking system and a selected target as a result of inadequate platform damping at a time of platform nutation mode excitation;
FIG. 3 is a different television camera raster presentation schematically illustrating the preferred lock-on relationship between a tracking system and a selected target achieved as a result of platform damping by the instant invention at the time of platform nutation mode excitation;
FIG. 4 is a schematic block diagram of a preferred embodiment of the tracker system platform invention of this application;
FIGS. 5 and 6 are front and side elevational views, respectively, of a tracking system platform and sensor combination having the features of the invention embodiment disclosed schematically in FIG. 4; and
FIG. 7 is a partial schematic block diagram of an alternate embodiment of the tracking system platform invention of this application.

The type of tracking system which this invention is broadly concerned with is illustrated generally by the schematic block diagram of FIG. 1. Such tracking system is referenced as 10 and is basically comprised of an optical sensor in the form of television camera unit 11, a platform and drive unit 12, and a tracker unit 13. The platform portion of unit 12 serves to support television camera 11; during operation of system 10 in its automatic tracking mode, the drive portions of unit 12 serve to move the platform and supported camera unit 11 in tracking relation to the relatively movable target T positioned within the field of view designated 14. Tracker unit 13 regulates tracking movement of platform and drive unit 12 and couples that unit to television camera 11 in a feedback control relation. In addition, system 10 may include a monitor unit 15 which takes the form of a typical monochrome television picture tube and which is used to present a visual display of the general tracking problem viewed by the optical sensor and an indication of system tracking alignment. A human operator normally provides the link which exists between monitor unit 15 and the command controls function designated 16. The operator is normally responsible for accomplishing such command functions as activating the system, selecting the system mode of operation (scanning or automatic tracking), selecting the target if choice is involved, and obtaining acquisition of a selected target in the system tracking reticle prior to locking-on for fully automatic system tracking. A power supply 17 of conventional form is typically included in system 10 to provide the preferred electrical energy for system operation.

Tracking systems of the type disclosed by FIG. 1 generally function on the basis of detecting and following the contrast that exists between the selected target T, usually in association with the target edges, and the scene background in field of view 14. As suggested by FIGS. 2 and 3, such systems in effect involve tracking, within the raster 18 developed by camera sensor 11, of contrasted edges of target images 19. In accomplishing such tracking, variably positioned horizontal tracking logic gates extending between vertical reticle lines 20 and 21 and variably positioned vertical tracking logic gates extending between horizontal reticle lines 22 and 23 are utilized for coincidence gating target edge marker pulses developed from detected contrast changes and to consequently derive tracking error correction signals that define the magnitudes of both azimuth and elevation target displacements. A more comprehensive description of a system of this general type may be obtained from co-pending application Ser. No. 403,398 filed Oct. 12, 1964 and assigned to the assignee of this application and invention.

Platform and drive unit 12 of the typical tracking system 10 to which this invention pertains is sometimes subjected to vibration from the platform support during automatic tracking. Such vibration has been recognized in some instances to adversely affect system tracking performance. As shown by FIG. 2, a severe degradation of image 19 resolution may result from the vibrational excitation of the platform nutation mode of motion relative to directional axis 37 (FIG. 6). In some instances, the target image may in effect be lost completely. I have discovered, however, that loss of tracking lock-on from the loss of contrast represented in FIG. 2 may be achieved through use of the tracking system platform stabilization arrangement described and claimed herein. More specifically, and as illustrated by FIG. 3, an image 19 of desider compratively high resolution may be obtained by the practice of this invention even in vibrational environments that otherwise would produce the image degradation result depicted and described in connection with FIG. 2. In certain vibration directionality and amplitude ranges, the difference is a difference between maintaining or losing system lock-on and automatic tracking.

As shown in FIGS. 5 and 6, a preferred embodiment of the instant invention includes an inner gimbal 24 that supports stabilization gyroscopes 25 and 26 as well as camera 11. Inner gimbal 24 is rotationally supported by outer gimbal 27 at vertical (yaw) axis 28 through the conventional shaft-bearing element combination represented schematically as 29. Outer gimbal 27 is rotationally supported by platform support 30 at transverse (pitch) axis 31 through the conventional shaft-bearing element combination represented schematically as 32. Yaw axis 28 and pitch axis 31 are normally at right angles to each other and to directional axis 37; axis 37 generally corresponds to the optical axis of television camera 11 when the system is aligned with target T in a tracking relationship. The platform and drive unit 12 illustrated in FIGS. 5 and 6 also typically includes yaw and pitch position pick-off devices 33 and 34 that are of conventional design and that provide output signals indicating the magnitude of gimbal rotational displacements about axes 28 and 31 and relative to the directional axis 37 associated with platform support 30. Yaw and pitch torquers 35 and 36, each an integral part of a servomechanism (41 and 44 of FIG. 4) of conventional design, are also considered to be important with respect to the FIGS. 4 through 7 tracking system platform embodiments. Such devices, sometimes through the actuation of gear trains, serve to effect a positioning or re-positioning of cooperating gimbals 24 and 27 relative to directional axis 37 and in response to input rate command signals sourced by tracker unit 13. A transparent window 38 may be included in platform unit 12 as a part of platform support 30.

Platform and drive unit 12 also includes the nutation damping feature of this invention. Such is designated generally as 40 in the drawings and serves to provide a feedback signal from yaw position pick-off device 33 to the pitch servomechanism loop designated 41. As indicated by FIG. 5, the servomechanism identified generally as 41 includes pitch torquer device 36 and a command signal input 42 in the form of an input amplifier. The rate command signal established by input amplifier 42 for servomechanism 41 is derived from the input signal provided from the tracker unit 13 taken in combination with the output signal of feedback loop 40 as preliminarily modified by compensation network 43. Feedback arrangement 40 thus comprises a closed platform servo loop that serves to supplement the closed tracking servo loop otherwise normally provided only as between units 12 and 13.

Compensation network 43 accomplishes conventional functions and generally is constructed to meet the performance capability specified for a particular tracking system operational or application requirement. Some of the functions accomplished by network 43 through conventional signal processing circuitry may include, in various combinations and as applicable: (1) demodulation of the output signal obtained from yaw position pick-off device 33 in the event an alternating current carrier is utilized; (2) differentiation of the pick-off signal modulated amplitude; (3) filtering out of unwanted noise components in the processed signals; (4) filtering out of particular platform support motion mode frequencies; (5) attenuation of amplitude effects of low frequency platform support vibration; and (6) amplification of processed signals to obtain high loop gains. Generally, the servomechanism device that receives the compensated feedback signal of the tracking system platform closed loop should have broad band response characteristics. The Laplace operator transforms for the equations of platform dynamics that are preferably considered in establishing the desired characteristic for compensation network 43 are disclosed generally by FIG. 4. Such transfer functions are represented conventionally within the dotted outline of the FIG. 4 showing of unit 12.

It should be noted that the invention arrangement disclosed by FIGS. 4 through 7 utilizes a form of nutation damping wherein the yaw position pick-off signal developed from device 33 serves as the basis for the feedback signal that is combined at amplifier 42 with the correction signal from tracker unit 13 to derive the rate command signal for servomechanism 41. In some applications the combination may be fashioned in an opposite manner and the feedback signal for loop 40 derived from pitch position pick-off device 34 and provided as an input to yaw servomechanism 44 after compensation and combining a yaw command input amplifier 45. The opposite combination is particularly desirable whenever the experienced vibrations of platform support 30 have amplitude components that are greater in directions generally parallel to axis 28 in comparison to those amplitude components that exist in directions generally parallel to pitch axis 31. Such opposite combination may also be desired by reason of substantially different rotational inertias for the gimbals 24 and 27 about axes 28 and 31. Also, platform 12 may be provided with an essentially doubled nutation mode damping capability, at double cost, by including therein both the FIG. 5 version of feedback arrangement 40 and its equivalent in opposite combination form.

FIG. 7 discloses an alternate embodiment of the FIGS. 4 and 5 arrangement. The additional embodiment incorporates the further feature of utilizing a yaw rate gyroscope 46 mounted on platform support 30. The output signal of rate gyro 46 is compared at error detector 48 with the yaw position pick-off signal derived at device 33 and compensated (differentiated) at network 47. The difference signal produced at detector 48 is then subjected to the additional necessary compensation (differentiating, filtering, attenuation, shaping, etc.) at network 43 and afterwards introduced into pitch amplifier 42 as a feedback signal to be combined with the pitch movement correction command of tracker unit 13.

I claim:

1. In a tracking system which generates electrical tracking error correction signals in response to detected voltage amplitude changes that exist in a television camera output video signal and that identify a selected target to control the viewing axis of the television camera in tracking relation to the selected target, in combination:
   (a) System support means having a directional reference axis and subjected to vibration in directions transverse to said directional reference axis;
   (b) Television camera sensor means that has a viewing axis and that forms an output video signal having voltage amplitude changes identifying contrast changes associated with a selected target;
   (c) Platform means that carries stabilization gyroscope means and said sensor means and that is rotatable about first and second platform axes positioned at right angles relative to each other and relative to said system support means directional reference axis and in response to input electrical tracking error correction signals derived from said sensor means output video signal;
   (d) Position pick-off means cooperating with said platform means at one of said first and second platform axes and forming an output signal proportional to the rotational displacement of said platform means and said sensor means about said one platform axis and relative to said support means directional reference axis;

(e) Servomechanism means cooperating with said platform means at the other of said first and second platform axis and rotating said platform means about said other platform axis and relative to said support means directional reference axis to a position where said sensor means viewing axis is contained in a plane normal to said one platform axis and in response to an input electrical tracking error correction signal derived from said sensor means output video signal; and (f) Signal loop means combining said one platform axis position pick-off means outpu tsignal with said other platform axis servomechanism means input electrical tracking error correction signal in rate form feedback relation, said loop means thereby increasing the dynamic damping of said platform means and said stabilization gyroscope means relative to said support means directional reference axis.

2. The invention defined in claim 1, wherein said one platform axis is an essentially vertical reference axis and wherein said other platform axis is an essentially horizontal reference axis, said television camera sensor means scanning the selected target along successive raster scan lines that are essentially parallel to said other platform axis when the viewing axis of said sensor means is parallel with said support means directional reference axis.

3. The invention defined by claim 1, wherein said one platform axis is an essentially horizontal reference axis and wherein said other platform axis is an essentially vertical reference axis, said television camera sensor means scanning the selected target along successive raster scan lines that are each essentially parallel to said one platform axis when the viewing axis of said sensor means is parallel with said support means directional reference axis.

4. The invention defined by claim 1, wherein there is further included:

(g) Additional position pick-off means cooperating with said platform means at said other platform axis and forming an output signal proportional to the rotational displacement of said platform means and said sensor means about said other platform axis and relative to said support means directional reference axis;

(h) Additional servomechanism means cooperating with said platform means at said one platform axis and rotating said platform means about said one platform axis and relative to said support means directional reference axis to a position where said sensor means receiving axis is contained in a plane normal to said other platform axis and in response to an input electrical tracking error correction signal derived from said sensor means output video signal; and (i) Additional signal loop means combining said additional position pick-off means output signal with said additional servomechanism means input electrical tracking error correction signal in rate form feedback relation, said additional loop means thereby additionally increasing the dynamic damping of said platform means and said stabilization gyroscope means relative to said support means directional reference axis.

5. The invention defined by claim 1, wherein there is further included:

(g) Rate gyroscope means mounted on said support means and providing an output signal measuring the rate of rotation of said support means directional reference axis about said one platform axis relative to free space; and (h) Error detector means comparing said rate gyroscope means output signal with said position pick-off means output signal in rate form and forming the difference thereof, said signal loop means combining the difference signal established by said error detector means with said other platform axis servomechanism means input electrical tracking error correction signal in rate form feedback relation.

6. The invention defined in claim 5, wherein said one platform axis is an essentially vertical reference axis and wherein said other platform axis is an essentially horizontal reference axis, said television camera sensor means scanning the selected target along successive raster scan lines that are each essentially parallel to said other platform axis when the viewing axes of said sensor means is parallel with said support means directional reference axis.

7. The invention defined in claim 5, wherein said one platform axis is an essentially horizontal reference axis and wherein said other platform axis is an essentially vertical reference axis, said television camera sensor means scanning the selected target along successive raster scan lines that are each essentially parallel to said one platform axis when the viewing axis of said sensor means is parallel with said support means directional reference axis.

References Cited
UNITED STATES PATENTS

| | | | |
|---|---|---|---|
| 2,414,108 | 1/1947 | Knowles | 93—49.2 |
| 2,959,375 | 11/1960 | Dunnegan | 178—7.2 |
| 3,156,915 | 11/1964 | Lang | 343—7.4 |
| 3,257,505 | 6/1966 | Van Wechel | 178—6.8 |
| 3,315,032 | 4/1967 | Hecker | 178—6.8 |
| 3,341,653 | 9/1967 | Kruse | 178—6.8 |

ROBERT L. GRIFFIN, Primary Examiner

J. A. ORSINO, Jr., Assistant Examiner

U.S. Cl. X.R.

178—6.8, 7.2; 250—203; 343—6